United States Patent
Parees et al.

(10) Patent No.: US 10,257,201 B2
(45) Date of Patent: Apr. 9, 2019

(54) MANAGEMENT OF SERVICE ACCOUNTS

(71) Applicant: Red Hat, Inc., Raleigh, NC (US)

(72) Inventors: Benjamin Parees, Durham, NC (US); Clayton Coleman, Raleigh, NC (US); David Eads, Raleigh, NC (US); Jordan Liggitt, Fuquay-Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 218 days.

(21) Appl. No.: 15/222,565

(22) Filed: Jul. 28, 2016

(65) Prior Publication Data

US 2018/0034823 A1 Feb. 1, 2018

(51) Int. Cl.
*H04L 29/06* (2006.01)

(52) U.S. Cl.
CPC .......... *H04L 63/102* (2013.01); *H04L 63/101* (2013.01); *H04L 63/105* (2013.01)

(58) Field of Classification Search
None
See application file for complete search history.

(56) References Cited

U.S. PATENT DOCUMENTS

| 8,060,920 | B2 | 11/2011 | Livingston et al. | |
|---|---|---|---|---|
| 8,424,077 | B2 | 4/2013 | Adams et al. | |
| 8,468,585 | B2 * | 6/2013 | Choi | G06F 21/33 726/5 |
| 8,732,852 | B2 | 5/2014 | Shu et al. | |
| 8,819,814 | B1 * | 8/2014 | Leach | H04L 63/08 709/202 |
| 8,990,907 | B2 | 3/2015 | Matson et al. | |
| 2007/0226774 | A1 * | 9/2007 | Pardo-Blazquez | H04L 29/06 726/1 |
| 2009/0328154 | A1 | 12/2009 | Field et al. | |
| 2013/0290477 | A1 * | 10/2013 | Lesage | H04L 67/34 709/217 |

(Continued)

FOREIGN PATENT DOCUMENTS

WO 2011/026695 A1 3/2011

OTHER PUBLICATIONS

Fusion Middleware Administrator's Guide for Oracle Identity Manager, 2016, Link: http://docs.oracle.com/cd/E27559_01/admin.1112/e27149/accesspolicies.htm#OMADM2253.

(Continued)

*Primary Examiner* — Kaveh Abrishamkar
(74) *Attorney, Agent, or Firm* — K&L Gates LLP

(57) ABSTRACT

The present disclosure provides new methods and systems for managing access to service accounts by user accounts. For example, a user account and a service account may be created. The user account may be granted a first permission to access the service account. The first permission may provide a user with a capability to access the service account by at least one of accessing the service account through the user account and directly accessing the service account. A first credential may be issued to the service account. A user account status event regarding a change to the first permission may automatically be detected. It may be determined that the first permission provided access to the service account A second credential may be issued to the service account. The second credential may invalidate the first credential and may prevent the user from directly accessing the service account.

19 Claims, 5 Drawing Sheets

(56) References Cited

U.S. PATENT DOCUMENTS

2015/0178113 A1\* 6/2015 Dake .................. G06F 9/45558
718/1

OTHER PUBLICATIONS

Service Accounts, OpenShift Enterprise 3.0, Developer Guide, May 30, 2016, Link: https://docs.openshift.com/enterprise/3.0/dev_guide/service_accounts.html.

\* cited by examiner

US 10,257,201 B2

MANAGEMENT OF SERVICE ACCOUNTS

BACKGROUND

The present disclosure relates generally to the management of service accounts. A user may have access to a user account and a user account may have access to a service account. A service account, also referred to as a machine account, may be used to perform actions on behalf of one or more user accounts. A permission may be granted to allow a user account to access a service account. The permission may also be revoked, preventing the user account from accessing the service account.

SUMMARY

The present disclosure provides new and innovative methods and systems for managing access to service accounts by users and user accounts. For example, in a method for managing service account access, a first user account may be created and a first service accounts may be created. The first user account may be granted a first permission to access the first service account. The first permission may provide a first user with a capability to access the first service account by accessing the first service account through the first user account or directly accessing the first service account. A first credential may be issued to the first service account. A user account status event regarding a change to the first permission may be automatically detected. Responsive to detecting the user account status event, it may be determined that the first permission provided access to the first service account and a second credential may be issued to the first service account. The second credential may invalidate the first credential and prevent the first user from directly accessing the first service account.

Additional features and advantages of the disclosed method and apparatus are described in, and will be apparent from, the following Detailed Description and the Figures.

DETAILED DESCRIPTION

Users, by way of user accounts, may create service accounts which may be employed to perform actions on behalf of the user or user account. An event may occur that changes the role of the user, and as a result, the user's user account's permissions to access service accounts may be changed. Accordingly, the user may no longer have permission to access a service account. However, the user may have retained the credential of the service account and may be able to access the service accounts. For example, prior to having a permission revoked, the user might have written down a credential that can be used to allow the user to act as the service account. Thus, a security breach of the service account may occur when user accounts without permission to access a service account present a retained credential and are granted access to a service account. Deleting the service accounts that the user account had access to would cause any automated jobs that the service account performs for other user accounts to fail. A policy of updating credentials on a predetermined interval of time does not allow for immediate replacement of credentials in the event of a user based status event. By tracking all user account permission to access various service accounts, a system may be able to issue updated credentials for the respective service accounts responsive to a change in permission of the user account. The updated credentials may prevent the user from accessing the service account. For example, a team manager may be promoted to a new role in a company. As such, the manager may no longer need to access the data that his previous team was analyzing. In order to protect the data, the manager may lose permission to access the service accounts associated the manager previously had permission to access. However, the manager may have written down or otherwise stored the credentials for the service accounts, which may be used by the manager to access the service accounts directly. The system issues new credentials to the service accounts the manager had permission to access before the manager's promotion in order to prevent the manager from accessing the service accounts the manager had access to before the manager's promotion. Other members of the manager's team may retain permission to access the service accounts and may also be able to retrieve the new credential from the service accounts.

Figure 1:
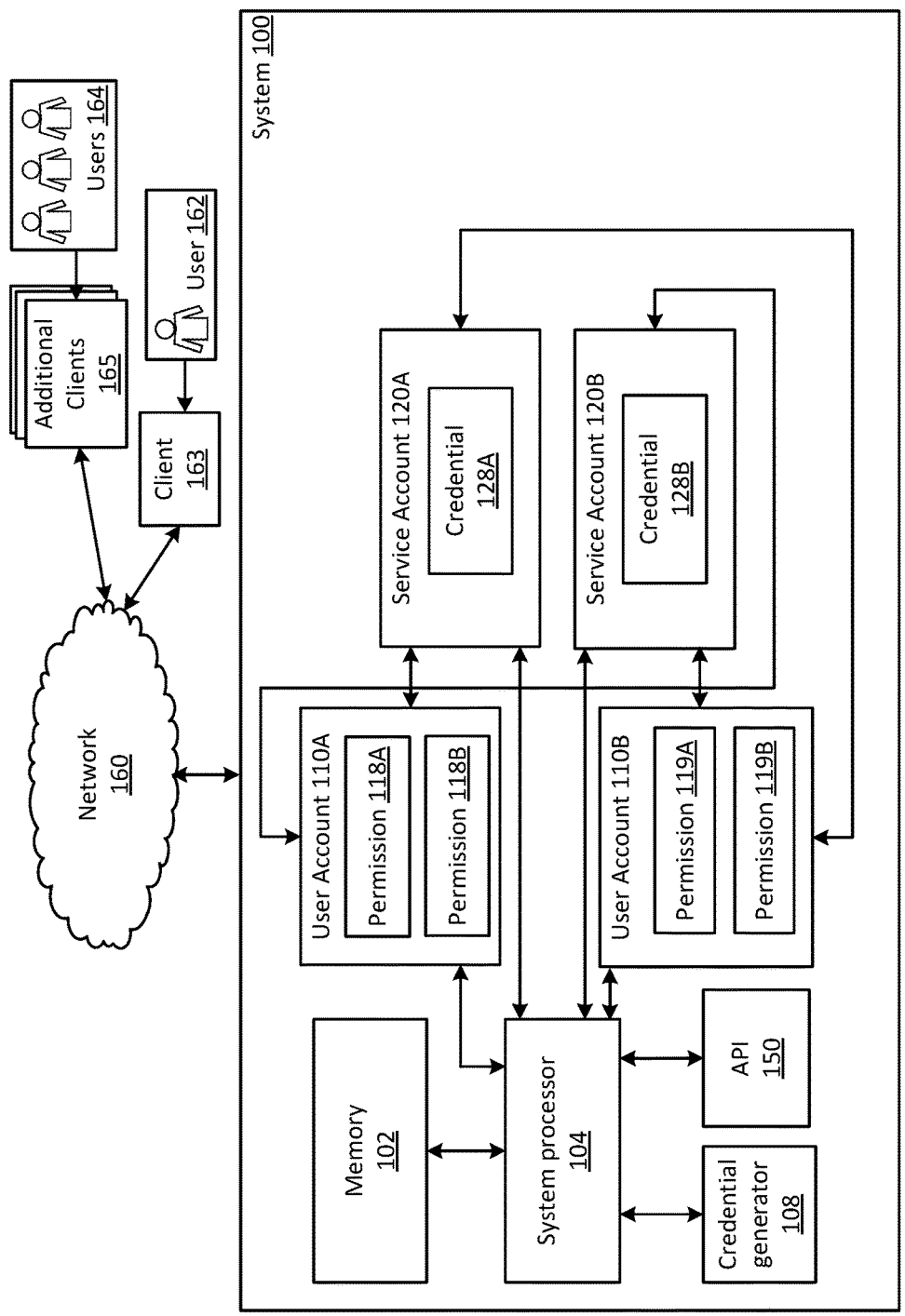
FIG. 1 is a block diagram of a service account system according to an example of the present disclosure.

FIG. 1 depicts a high level system diagram of an example system 100 for managing the credentials of various service accounts. The system may include a memory 102 and a system processor 104. The system processor 104 may be communicatively coupled to the memory device 102. As used herein, physical processor or processor 104 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Only one system processor 104 is shown, but more than one processor may perform the same functions. Additional processors may be interconnected using a variety of techniques, ranging from a point-to-point processor interconnect, to a system area network, such as an Ethernet-based network. As discussed herein, a memory 102 refers to a volatile or non-volatile memory device, such as RAM, ROM, EEPROM, or any other device capable of storing data.

The system may further include a credential generator 108. The credential generator 108 may include separate memory and processing, or the credential generator 108 may utilize the memory device 102 and system processor 104 of the system 100. The credential generator 108 may issue credentials 128A-B responsive to requests for credentials 128A-B via the system application programming interface ("API") 150.

A user 162 may access the system 100 via client 163 through a network 160. For example, the network 160 may be a public network (e.g., the Internet), a private network (e.g., a local area network (LAN) or wide area network (WAN)), or a combination thereof. In an example, a user 162 may access the system 100 via the Internet. In another example, a user 162 and additional users 164 may access the system via a LAN, by using a client 163 and additional clients 165 respectively. In an example, the system for managing credentials 100 may be an OpenShift® system.

A user 162 may have access to a user account 110A. Typically, a user 162 may have access to a single user account 110A. A user 162 may have a credential that the user 162 may present to the system 100 to verify that the user 162 may access the user account 110A.

A user account 110A may have a permission 118A to access a service account 120A. A system 100 may manage permissions (e.g., 118A, 118B, 119A and 119B) of user accounts (e.g., 110A and 110B) to access service accounts (e.g., 120A and 120B). The system 100 may default to not to allow user accounts to have access to any service account in a system 100 until a permission has been granted to a specific user account. For example, a user account 110A may have access to no service accounts in a system, and individual service account permissions 118A may then be added to the user account 110A that allow the user account 110A to access a service account 120A. Alternatively, the system 100 may default to allow every user account 110A-B in a system 100 to access every service account 120A-B in the system 100 until permissions have been revoked by the system 100. For example, a user account 110B may initially be granted permission 119A-B to each service account 120A-B, and individual service account permission 119B may then be removed from the user account 110B preventing the user account 110B from accessing service account 120B.

The permission 118A may provide the user 162 with a capability to access a service account 120A through the user account 110A. The permission 118A may also provide the user 162 with a capability to access the service account 120A directly, without going through the user account. As illustrated in FIG. 1, a user account 110A may have an additional permission 118B that allows the user account 110A to access an additional service account 120B. The user account 110A may have additional permissions not shown in the figure. As further illustrated in FIG. 1, an additional user account 110B may also have permissions 119A and 119B to access service accounts 120A and 120B. Each service account 120A, 120B, may include a credential 128A, 128B, respectively. For example, service account 120A includes credential 128A and service account 120B includes credential 128B. In an example, credentials may be stored in an OpenShift® server. In another example, credentials may be stored in an ETCD® server.

Figure 2:
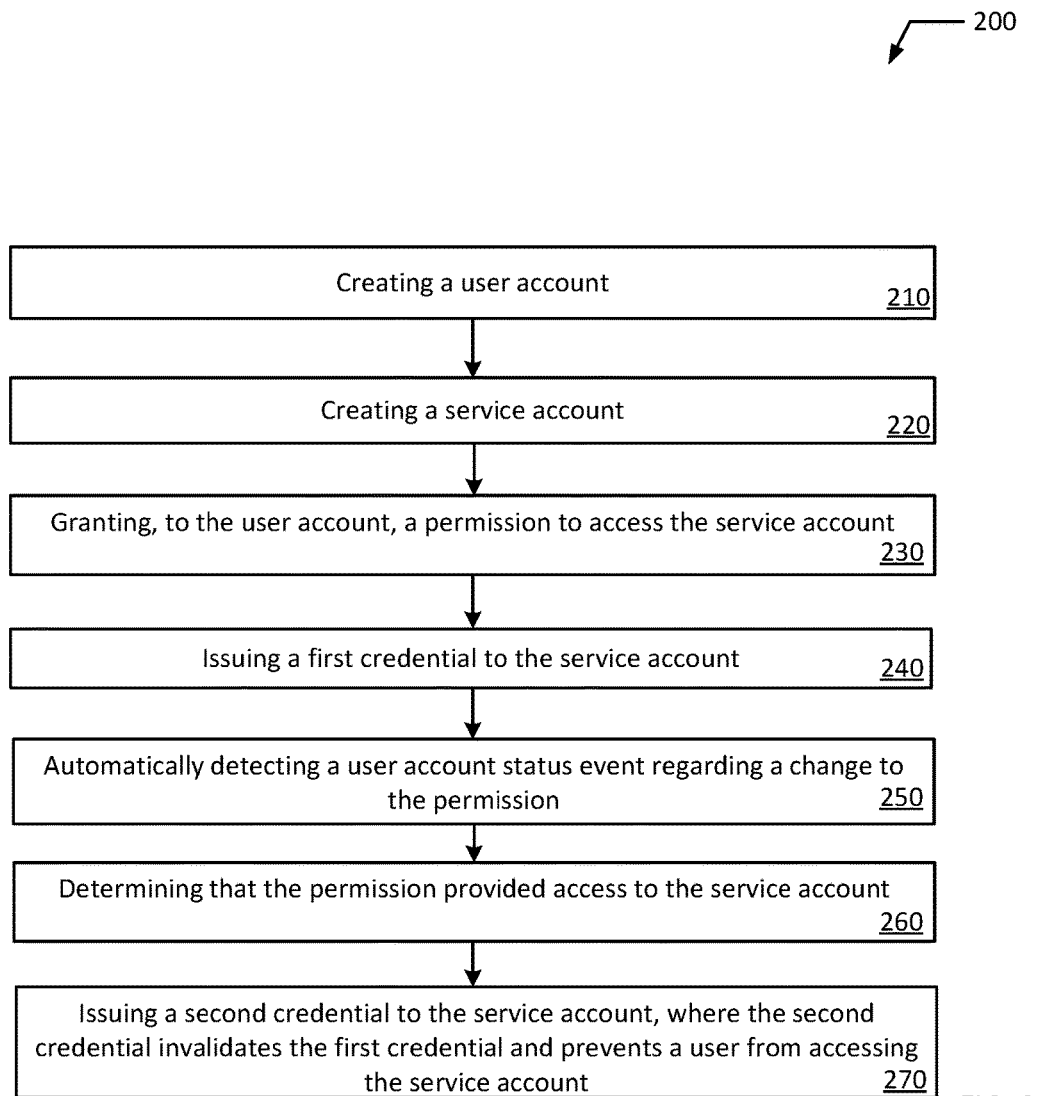
FIG. 2 is a flowchart illustrating an example method for managing service account credentials according to an example of the present disclosure.

FIG. 2 is a flowchart illustrating an example method for managing service account credentials according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. In an example, the method 200 may be performed by processing logic that may comprise hardware (circuitry, dedicated logic, etc.), software, or a combination of both.

The example method 200 starts by creating a first user account (block 210). A user account 110A may be associated with a user. For example, the user may be an accountant in the finance department of a company.

The example method 200 continues by creating a first service account (block 220). A user 162 may create a service account 120A. The service account 120A may be enabled to perform tasks on behalf of the user 162 or on behalf of the user account 110A. For example, a service account 120A may be a sales service account that provides for the manipulation of sales data.

The first user account may be granted a first permission to access the first service account (block 230). The permission 118A may provide a user 162 with a capability to access the service account 120A. The permission 118A may provide a user 162 with the capability to access the service account 120A through the user account 110A via a client 163. The permission 118A may allow the user account 110A to view the credential 128A of a service account 120A. Once the user account 110A has viewed the credential 128A of the service account 120A, the user account 110A has the credential 128A and can use that credential 128A to connect to the service account 120A. For example, the accountant's user account may have permission to access the first service account. The permission may allow the account to access the first service account through the accountant's user account.

Accessing the service account 120A through the user account 110A may include various different types of access. For example, the user account 110A may have access to view the service account 120A, change configuration data of the service account 120A, delete services running on the service account 120A, add additional services to be run on the service account 120A, and/or update services running on the service account 120A. Viewing the service account 120A may include viewing the data of the service account, viewing the credential 128A of the service account 120A, and/or viewing the operations of the service account 120A.

The permission 118A may also provide the user 162 with the ability to access the service account 120A directly. Specifically, once the user account 110A has the credential 128A, the user 162 can retain the credential 128A. For example, the credential 128A may be stored locally on a computer of the user 162, accessible by the user 162 via the client 163, stored in a file that the user 162 has access to, written down by the user 162 on a piece of paper, or the like. Thus, the credential 128A allows the user 162 to access the service account 120A directly, without going through the user account 110A, by presenting the credential 128A directly to the service account 120A. For example, the user 162 may access the service account 120A directly, through the client 163, by presenting the credential 128A to the service account 128A. Alternatively, the user 162 may access the service account 120A directly, though an additional client 165, by presenting the credential 128A to the service account 128A.

A first credential is issued to the first service account (block 240). The credential 128A may be issued at the request of an API 150. The API 150 may request a credential 128A from the credential generator 108. The credential 128A may be a token, a password, a digital certificate. For example, a token is issued to the sales service account.

A user account status event regarding a change to the first permission may be automatically detected (block 250). The user account status event may occur as a result of a change to the permission 118A. For example, a user 162 may receive a promotion in their job, be fired from their job, reset their credential to access their user account 110A after suspicious account activity, or the like. A user account status event may indicate that a permission 118A to access the service account 120A has been revoked. The user status event may be detected by an API 150 as the API 150 intercepts an update to the permission 118A. For example, the accountant may be promoted to a manager position within the same company.

The first permission that was changed may be determined as providing access to the first service account (block 260). For example, after a permission 118A of a user account 110A has been changed, the system 100 may determine all service accounts 120A-B that the user account 110A had permission to access. A user 162 of a user account 110A may no longer be able to access a service account 120A through the user account 110A because the permission 118A to access the service account 120A has been revoked, however, if the user 162 of the user account 110A retained the credential 128A of the service account 120A, the user 162 could present the credential 128A to the service account 120A and directly access the service account 128A. After determining that the permission 118A provided access to the service account 120A, the credential 128A of the service account 120A may be changed or rotated and first user 162 may not be able to access the service account 120A directly.

A second credential may be issued to the first service account (block 270). The second credential invalidates the first credential. For example, a new token invalidates the token that had previously been issued to the sales service account. The new token prevents the manager (the promoted accountant) from directly accessing the sales service account. If the manager retained the token and presented the invalidated token to the service account, the manager would be prevented from accessing the sales service account.

An additional user account 110B may also be created. The user account 110B may have a permission 119A to access the service account 120A. The permission 119A may provide an additional user 164 with a capability to access the service account 120A. The permission 119A may provide a user 164 with the capability to access the service account 120A through the user account 110B. The permission 119A may allow the user account 110B to view the credential 128A of a service account 120A. Once the user account 110B has viewed the credential 128A of the service account 120A, the user account 110B has the credential 128A and can use that credential 128A to connect to the service account 120A. For example, the additional user may be a secretary at the same company as the accountant.

The permission 119A may also provide the user 164 with the ability to access the service account 120A directly. Once the user account 110B has the credential 128A, the user 164 can store the credential 128A. The credential 128A may be stored locally on a computer of the user 164, the credential 128A may be stored in a file that the user 164 has access to, the credential 128A may be written down by the user 164 on a piece of paper. The credential 128A allows the user 164 to access the service account 120A directly, without the aid of the user account 110B, by presenting the credential 128A directly to the service account 120A. For example, the secretary may have permission to access the sales service account. The permission 119A may be retained after the permission 118A is revoked from the user account 110A. The user account 110B may access the service account 120A and view the credential 128A with a retained permission 119A. The user account 110B may retain permission 119A to access the service account 120A after a second credential replaces and invalidates the credential 128A. The user account 110B can view the second credential and continue to access the service account 120A with the second credential. The user account 110B may also continue to use permission 119A to access the service account 120A regardless of whether the user 164 stores the second credential. For example, the secretary may retain permission to access the sales service account after the accountant was promoted to manager.

A service account 120B may be created. The user account 110A may further have permission 118B to access the service account 120B and the user account 110B may have permission 119B to access the service account 120B. For example, the service account 120B may be a finance department payroll service account. The secretary and the accountant may have access to the sales service account and the finance department payroll service account.

Permission 118B may provide a user 162 with a capability to access the service account 120B. The permission 118B may provide a user 162 with the capability to access the service account 120B through the user account 110A. Permission 118B may allow the user account 110A to view the credential 128B of a second service account 120B. Once the user account 110A has viewed the credential 128B of the service account 120B, the user account 110A has the credential 128B and can use that credential 128B to connect to the service account 120B.

Permission 118B may also provide the user 162 with the ability to access the service account 120B directly. Once the user account 110A has the credential 128B, the user 162 can store the credential 128B. The credential 128B may be stored locally on a computer of the user 162, the credential 128B may be stored in a file that the user 162 has access to, the credential 128B may be written down by the user 162 on a piece of paper. The credential 128B allows the user 162 to access the service account 120B directly, without the aid of the user account 110A, by presenting the credential 128B directly to the service account 120B.

The user account 110B may have a second permission 119B to access the service account 120B. Permission 119B may provide a user 164 with a capability to access the service account 120B. Permission 119B may provide a user 164 with the capability to access the service account 120B through the user account 110B. Permission 119B may allow the user account 110B to view the credential 128B of the service account 120A. Once the user account 110B has viewed the credential 128B of the service account 120B, the user account 110B has the credential 128B and can use that credential to connect to the service account 120B.

Permission 119B may also provide the user 164 with the ability to access the service account 120B directly. Once the user account 110B has the credential 128B, the user 164 can store the credential 128B. The credential 128B may be stored locally on a computer of the user 164, the credential 128B may be stored in a file that the user 164 has access to, the credential 128B may be written down by the user 164 on a piece of paper. The credential 128B allows the user 164 to access the service account 120B directly, without the aid of the user account 110B, by presenting the credential 128B directly to the service account 120B.

After a permission 118A of a user account 110A has been changed, it may be necessary to determine all service accounts 120A-B that the user account 110A had access to. A user 162 of a user account 110A may no longer be able to access a service account 120A or a second service account 120B through the user account 110A because the permissions 118A and 118B to access the service accounts 120A and 120B have been revoked. The permissions 119A and 119B of a user account 110B may not have been revoked, and the user account 110B may retain permissions 119A and 119B to access the service accounts 120A and 120B respectively. By determining the that the permissions 118A and 118B provided access to service accounts 120A and 120B, the credentials 128A and 128B of the service accounts 120A and 120B may be changed or rotated and the user 162 may not be able to access the service account 120A directly. The user 164 may access the service accounts 120A and 120B through the user account 110B after the credentials 128A and 128B have been changed or rotated if the permissions 119A and 119B have not been changed. The user account 110B can view the changed or rotated credentials of the service accounts 120A and 120B and continue to access the service accounts 120A and 120B. The user account 110B may also continue to request the service accounts 120A and 120B perform actions on behalf of the user account 110B as permitted by permissions 119A and 119B. User account 110B includes permissions 119A and 119B and may not need to present the new credentials to the service accounts 120A and 120B. User account 110A cannot access service accounts 120A and 120B without the proper credential after permission 118A and 118B are revoked. User account 110A no longer has permission 118A and 118B, nor does user account 110A have the correct credential needed to access service accounts 120A and 120B. For example, after the accountant is promoted to manager, the manager loses permission to view the sales service account and the accounting payroll service account. The credentials of the sales service account and the accounting payroll service account are invalidated by new credentials that are issued to the service accounts respectively. The secretary may retain permission to access the service accounts. Access to the service accounts may provide the secretary with the new credentials. The manager, who does not have permission to access the service accounts, may not access the new credential and is prevented from accessing the service accounts through the managers user account. The manager does not have the new credential, and cannot directly access the service accounts.

The user 162 and the second user 164 may share a characteristic. For example, the first user 162 and second user 164 may work for the same department or division of a business or may work on the same project. Additionally, the first and second user 162 and 164 may access the same data with the service accounts 120A-B accessed by the first and second user 162 and 164.

Figure 3:
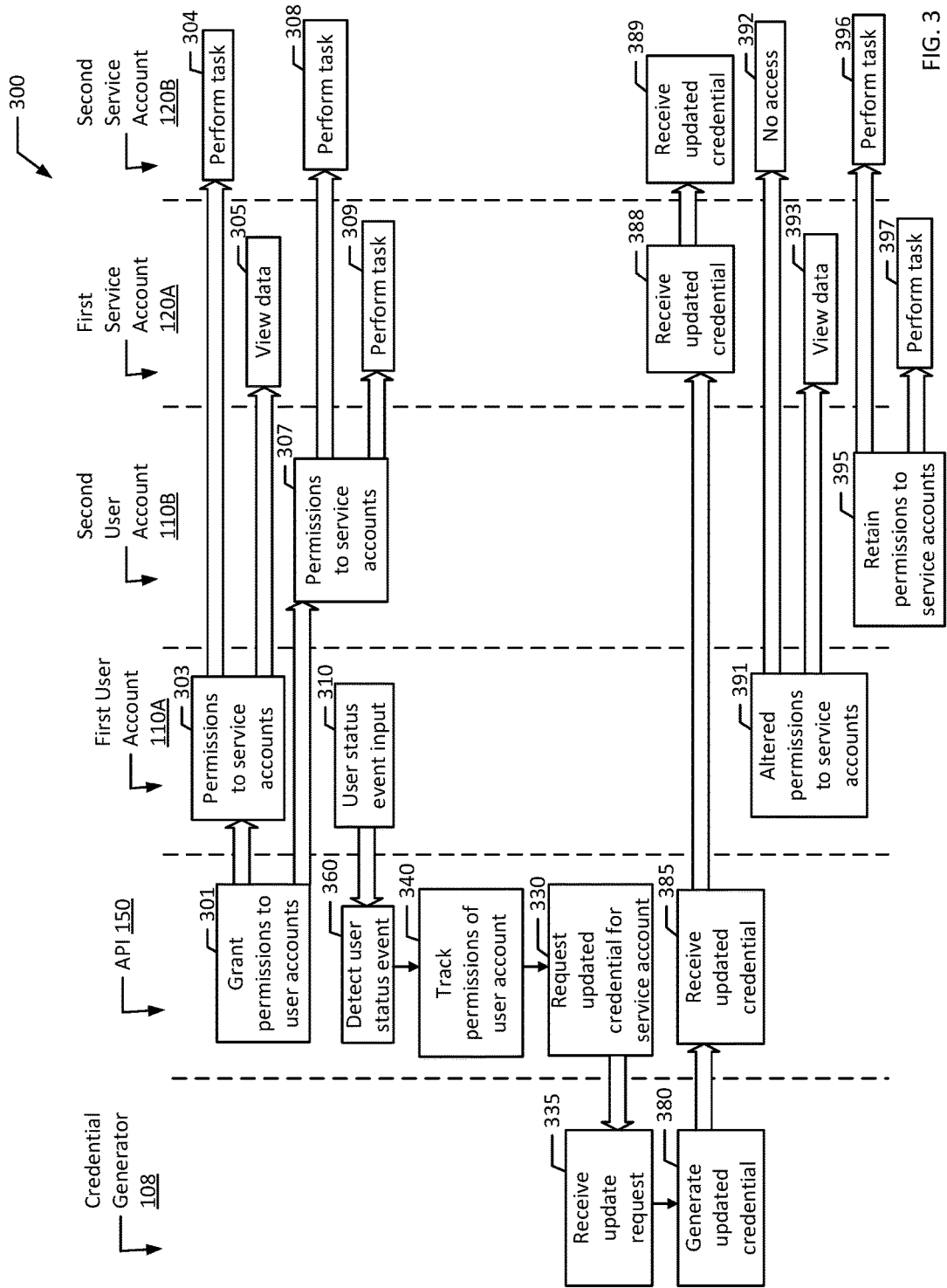
FIG. 3 is a flow diagram illustrating an example method for managing service account credentials according to an example of the present disclosure.

FIG. 3 is a flowchart illustrating an example method for managing an application deployment pipeline according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example, the method 300 may be performed by processing logic that may comprise hardware (circuitry, dedicated logic, etc.), software, or a combination of both.

The example method 300 starts with an API 150 granting permission to a first user account 110A and a second user account 110B (block 301). The user account 110A may have permissions to access the service account 120A and the service account 120B (block 303). A permission of the user account 110A may be that the user account 110A can access the service account 120B to perform a task (block 304). For example, the task may be a batch processing task. A permission of the user account 110A may be that the user account 110A can view the data of a service account 120A (block 305).

The user account 110B may have permissions to access the service account 120A and the service account 120B (block 307). A permission of the user account 110B may be that the user account 110B can access the service account 120A to perform a task (block 308). A permission of the user account 110B may be that the user account 110B can access the service account 120B to perform a task (block 309).

A user status event input may occur for the user account 110A (block 310). For example, the user status event may be that the user of the user account 110A has been demoted from their position on a team. When the decision is made to demote the user from the team, the user may still be employed at the company. The change in role of the user may be input into the computer system of the company, for example, by a system administrator, changing the service accounts that the user account has permission to access. After permission 119A is revoked, the user account 110B may no longer have access to the service account 120A but a user 162 of the user account 110B may have the credential 128A, and may present the credential 128A directly to service account 120A. The user 162 of user account 110B may be able to directly access service account 120A after the permission 119A to access service account 120A revoked.

The user event status event may be detected by the API 150 (block 360). For example, the API 150 may intercept the change in permissions of the user account 110A. The API 150 may receive an update responsive to a change in permission of the user account 110A.

The API 150 may track the permissions of the user accounts 110A and 110B (block 340). Tracking of the permissions of the user account 110A may be done by traversing the flow of service accounts that the user account 110A had access to. The tracking or traversing may be accomplished by walking a graph of user account-service account relationships. Alternatively, the tracking of permissions may be done through the API 150 searching a database. For example, the API 150 may query a database of service accounts and user accounts to return all accounts that share permission with the user account 110A. Alternatively, the API 150 may perform a table scan with an index to return all entries in a table that match to the index. The index may include the service account 110A.

The API 150 may request updated credentials for each service account that the user account 110A had permission to access (block 330). The update credential request may be received by the credential generator 108 (block 335). Responsive to receiving the update credential request, the credential generator 108 may generate an updated credential for each tracked service account (block 380). For example, for each of the service accounts 120A and 120B that user account 110A has access to, a new token is generated by the credential generator 108.

The API 150 may receive the updated credential for each tracked service account (block 385). The API 150, having tracked the service account, replaces the credentials of service accounts 120A and 120B with the updated credentials from the credential generator. The service account 120A receives an updated credential (block 388), and the service account 120B receives an updated credential (block 389).

A user account, as a result of the user status event input, may have altered permissions to access service accounts (block 391). For example, the user account 110A may lose permission to access the service account 120B (block 392). For example the service account 120B may have included the data that the team was analyzing, and based on the demotion, the user 162 may no longer need access to the data. The user account 110A may have retained permission to access to the service account 120A (block 393). For example, the service account 120A may have included an internal company directory, and the first user retained permission to view the service account 120A.

The user account 110B may have retained permissions to access the service account 120A and the service account 120B (block 395). A retained permission of the user account 110B may be that the user account 110B can access the service account 120A to perform a task (block 396). For example, the second user account may belong to an additional user 164 who did not get removed from the team, and the user 164 retains access to the data the team was analyzing. A permission of the user account 110B may be that the user account 110B can access the service account 120B to perform a task (block 397). For example, the service account 120A provides the internal company directory, and the second user may retain access to edit the internal company directory.

Figure 4:
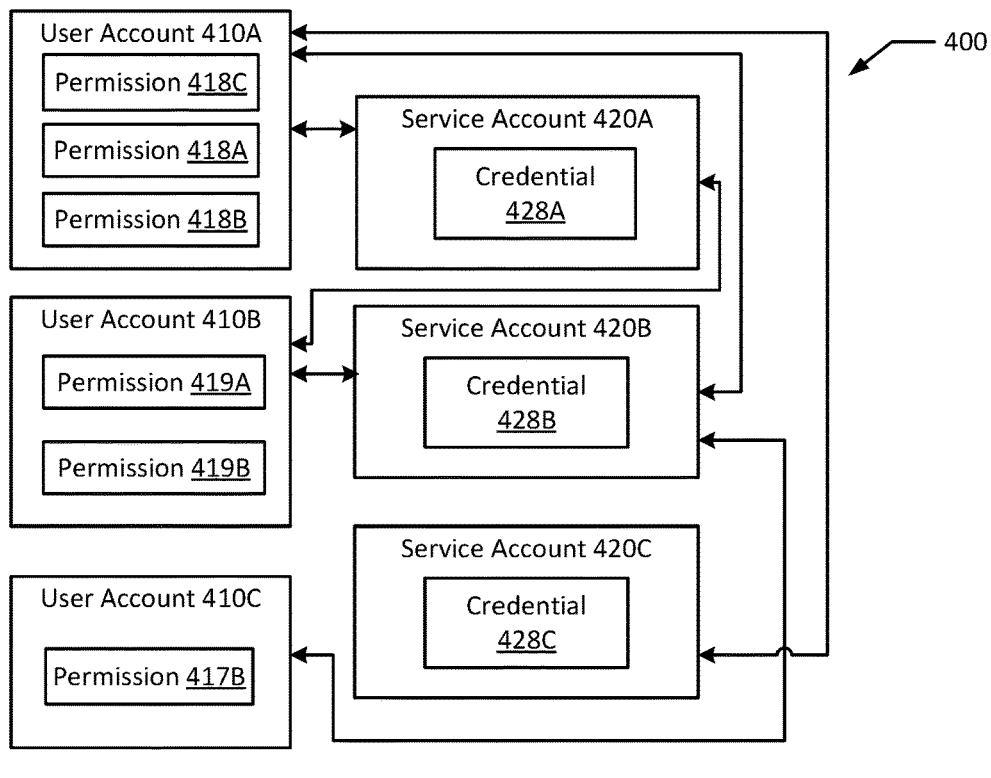
FIG. 4 is a block diagram of permission and credential management according to an example of the present disclosure.
Figure 4:
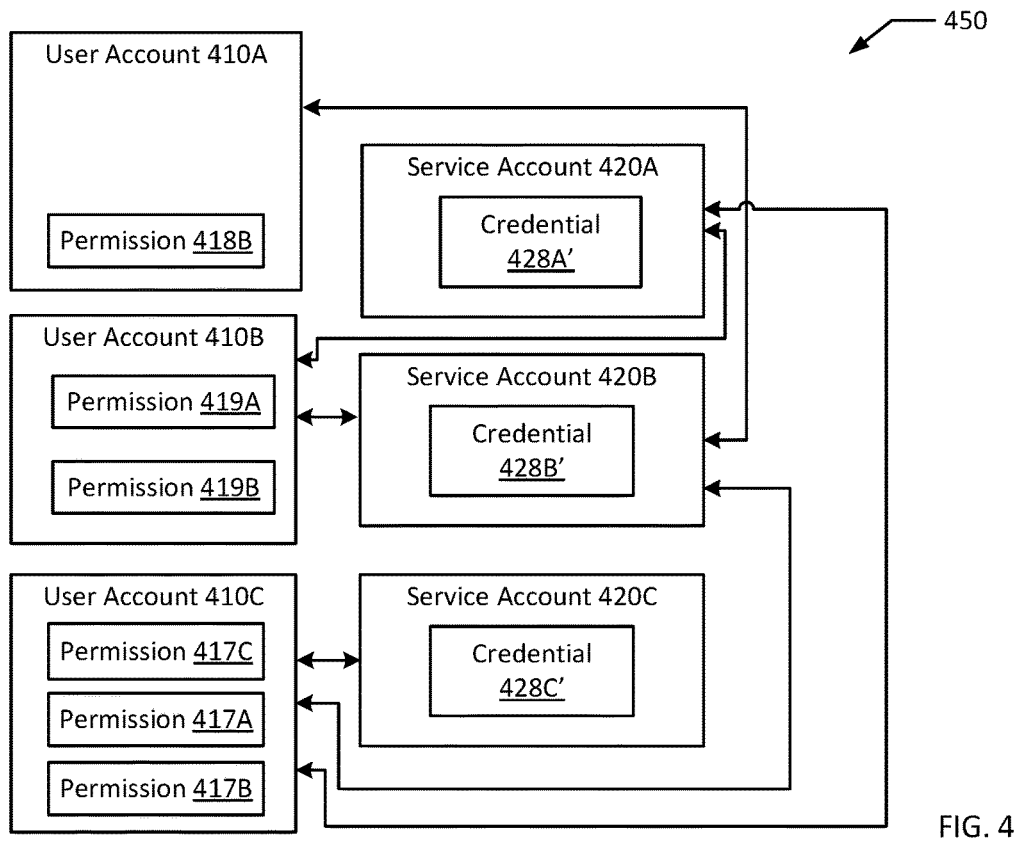

FIG. 4 is a block diagram of permission and credential management according to an example of the present disclosure. FIG. 4 depicts a service account system before a user account status event 400 and a service account system after a user account status event 450.

Before a user account status event, the system 400 shows three user accounts 410A-C and three service accounts 420A-C. Each user account 410A-C has permissions 418A-C, 419A-B and 417B respectively. In an example, user account 410A may have permissions 418A, 418B, and 418C that grant user account 410A access to service accounts 420A, 420B, and 420C respectively. User account 410A has permission to access service accounts 420A, 420B, and 420C; thus, user account 410A can view the credentials of the service accounts (e.g., credential 428A for service account 420A, credential 428B for service account 420B, and credential 428C for service account 420C). The user associated with user account 410A may access the service accounts 420A-C through user account 410A, or the user may access the service accounts 420A-C directly with the credential 428A-C if the user saved the credential 428A-C after accessing the service account 420A-C.

For example, user account 410A may belong to a manager of a team in the research and development department. The manager may need permissions 418A-C to access to service account 420A, which may be a data set that the team is performing analysis on, service account 420B, which may be a payroll system the company that the team works for uses to track time spent on a project, and service account 420C, which may be the results of the study that the team is performing with the data.

User account 410B may belong to a team member of the team. User account 410B has permissions 419A-B to access service accounts 420A and 420B, the data set that the team is working on and payroll. User account 410B does not have permission to access service account 420C, the results of the study that the team is performing with the data. User account 410C may belong to a manager in a different department. The manager of user account 410C may have permission 417B to access only service account 420B for payroll.

A user account status event may occur. For example, the manager of user account 410A may be transferred to a different project. Accordingly, new credentials may be issued to all service accounts that the user account had access to.

After the user account status event occurs, the system 450 still may include the three user accounts 410A-C and the three service accounts 420A-C. However, the permissions of user account 410A have been changed. User account 410A has permission 418A which allows user account 410A to access service account 420B. After accessing service account 420B, user account 410A can view the updated credential 428B'. User account 410A does not have permission 418A or permission 418C. The manager of user account 410A cannot access service accounts 420A or 420C through user account 410A. The credentials of service account 420A and 420C may be invalidated by credentials 428A' and 428C', which may prevent the manager from directly accessing service accounts 420A and 420C even if the manager retained the credentials 428A and/or 428C.

After the user account status event, the team member who has access to user account 410B retains the same permissions 419A and 419B that the team member had before the user status event. Retained permissions 419A and 419B allow user account 410B to access service accounts 420A and 420B. The updated credentials 428A' and 428B' may be viewed by the user account 410B with the retained permissions 419A and 419B to access service accounts 420A and 420B.

The second manager, who had access to user account 410C, may be transferred to the team to manage the team in the research and development department. As a result, user account 410C may be granted additional permissions 417C and 417A, in addition to retained permission 417B. These permissions 417A-C may grant user account 410C access to service accounts 420A-C. The updated credentials 428A', 428B' and 428C' of service accounts 420A-C may be viewed by the user account 410C. The second manager may access service accounts 420A-C through the user account 410C, or directly, by presenting the updated credentials 428A'-C' to the service account 420A-C.

Figure 5:
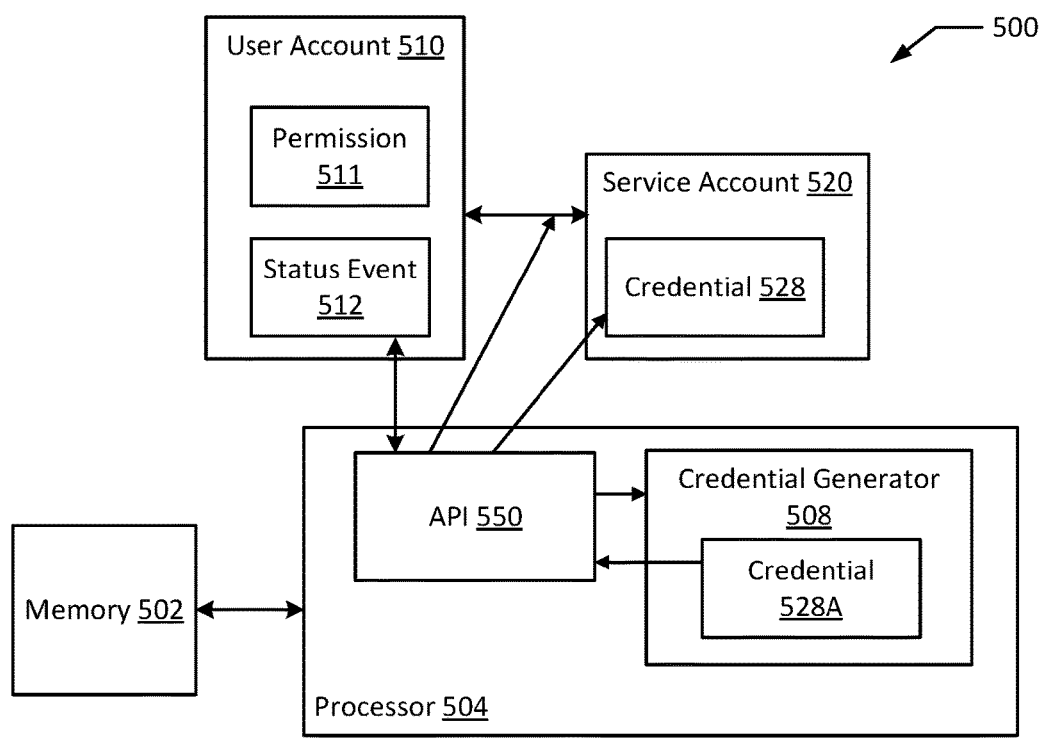
FIG. 5 is a block diagram of a service account system according to an example of the present disclosure.

FIG. 5 is a block diagram of a service account system 500 according to an example of the present disclosure. System 500 includes a memory 502 communicatively coupled to a processor 504. The system may include an API 550 and a credential generator 508. The system may include a user account 510 and a service account 520. The service account 520 may have a credential 528. The API 550 may grant permission 511 for the user account 510 to access the service account 520. The user account 510 may have a permission 511 to access the service account 520. The permission 511 may provide a user of the user account 510 with a capability to access the service account 520 by accessing the service account 520 through the user account 510. The permission 511 may provide a user of the user account 510 with a capability to access the service account 520 by directly accessing the service account 520. The API 550 may automatically detect a status event 512. The status event 512 may be regarding a change to the permission 511 of the user account 510. The API 550 may determine that the user account 510 had permission 511 to access the service account 520. The API 550 may issue a credential 528A to the service account 520. The credential 528A may invalidate the first credential 528. The credential 528 may prevent a user of the user account 510 from directly accessing the service account 520. A change of permission 511 may prevent the user of the user account 510 from accessing the service account 520 through the user account 510.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The invention claimed is:

1. A method for managing service account access comprising:
   creating a first user account;
   creating a first service account;
   granting, to the first user account, a first permission to access the first service account, wherein the first permission provides a first user with a capability to access the first service account by at least one of accessing the first service account through the first user account and directly accessing the first service account;
   issuing a first credential to the first service account;
   automatically detecting, by an API, a user account status event regarding a change to the first permission by intercepting, by the API, the change to the first permission; and
   responsive to detecting the user account status event, determining that the first permission provided access to the first service account, and issuing a second credential to the first service account,
   wherein the second credential invalidates the first credential and prevents the first user from directly accessing the first service account.

2. The method of claim 1, further comprising:
   creating a second user account; and
   granting, to the second user account, a second permission to access the first service account, wherein the second permission provides a second user with a capability to access the first service account by at least one of accessing the first service account through the second user account and directly accessing the first service account, and wherein the second user retains the capability to directly access to the first service account after the second credential invalidates the first credential.

3. The method of claim 1, further comprising:
   creating a second user account;
   creating a second service account;
   granting, to the first user account, a second permission to access the second service account, wherein the second permission provides a first user with a capability to access the second service account by at least one of accessing the second service account through the first user account and directly accessing the second service account;
   granting, to the second user account, a third permission to access the first service account and a fourth permission to access the second service account, wherein the third permission provides a second user with a capability to access the first service account by at least one of accessing the first service account through the second user account and directly accessing the first service account, and wherein the fourth permission provides the second user with a capability to access the second service account by at least one of accessing the second service account through the second user account and directly accessing the second service account; and
   issuing a third credential to the second service account.

4. The method of claim 3, further comprising:
   responsive to detecting the user account status event, determining that the second permission provided access to the second service account, and issuing a fourth credential to the second service account,
   wherein the fourth credential invalidates the third credential and prevents the first user from directly accessing the second service account.

5. The method of claim 4, wherein the second user account retains the capability to directly access both of the first service account and the second service account after the fourth credential invalidates the third credential.

6. The method of claim 3, wherein the first user account and second user account share a characteristic.

7. The method of claim 1, wherein the user account status event indicates that the first permission has been revoked.

8. The method of claim 1, wherein the first service account performs batch processing tasks on behalf of the first user account.

9. The method of claim 1, wherein accessing the first service account through the first user account includes at least one of view, change configuration data, delete running services, add running services, and update running services.

10. The method of claim 1, wherein accessing the first service account through the first user account includes viewing data of the first service account, including the first credential, before the second credential is issued.

11. The method of claim 1, wherein the first credential and the second credential are tokens.

12. A system for managing service account access comprising:
   a processor;
   a memory;
   a first user account;
   a first service account, wherein the first user account has a first permission to access the first service account, and wherein the first permission provides a first user with a capability to access the first service account by at least one of accessing the first service account through the first user account and directly accessing the first service account;
   an API executing on the processor; and
   a credential generator,
   wherein the API:
      issues a first credential to the first service account;
      automatically detects a user account status event regarding a change to the first permission by intercepting the change to the first permission;
      responsive to detecting the user account status event, determines that the first permission provided access to the first service account, and issue a second credential to the first service account, wherein the second credential invalidates the first credential and prevents the first user from directly accessing the first service account.

13. The system of claim 12, wherein the API further requests the second credential from the credential generator, and wherein the credential generator generates the second credential.

14. The system of claim 12, further comprising:
a second service account,
wherein the API further:
determines that a second permission provides the first user account access to the second service account, wherein the second permission provides a first user with a capability to access the second service account by at least one of accessing the second service account through the first user account and directly accessing the second service account;
requests a third credential from the credential generator; and
issues the third credential to the second service account.

15. The system of claim 12, further comprising:
a second user account; and
a second service account, wherein the first user account has a second permission to access the second service account, wherein the second permission provides a first user with a capability to access the second service account by at least one of accessing the second service account through the first user account and directly accessing the second service account, wherein the second user account has a third permission to access the first service account and a fourth permission to access the second service account, wherein the third permission provides a second user with a capability to access the first service account by at least one of accessing the first service account through the second user account and directly accessing the first service account, wherein the fourth permission provides the second user with a capability to access the second service account by at least one of accessing the second service account through the second user account and directly accessing the second service account, and wherein the API further:
issues a third credential to the second service account.

16. The system of claim 15, wherein the API further:
responsive to detecting the user account status event, determines that the second permission provided access to the second service account, and issues a fourth credential to the second service account,
wherein the fourth credential invalidates the third credential and prevents the first user from directly accessing the second service account.

17. The system of claim 16, wherein the second user retains the capability to directly access both the first service account and the second service account after the fourth credential invalidates the third credential.

18. The system of claim 12, wherein accessing the first service account through the first user account includes at least one of view, change configuration data, delete running services, add running services, and update running services.

19. A non-transitory computer readable medium storing instructions, which when executed by a processor, cause an API to:
grant, to a first user account, a first permission to access a first service account, wherein the first permission provides a first user with a capability to access the first service account by at least one of accessing the first service account through the first user account and directly accessing the first service account;
issue a first credential to the first service account;
automatically detect a user account status event regarding a change to the first permission by intercepting the change to the first permission; and
responsive to detecting the user account status event, determine that the first permission provided access to the first service account, and issue a second credential to the first service account,
wherein the second credential invalidates the first credential and prevents the first user from directly accessing the first service account.

* * * * *